Oct. 9, 1934.  H. E. DOERR  1,976,546
COUNTERBALANCE FOR LOCOMOTIVE DRIVE WHEEL CENTERS
Filed May 13, 1932
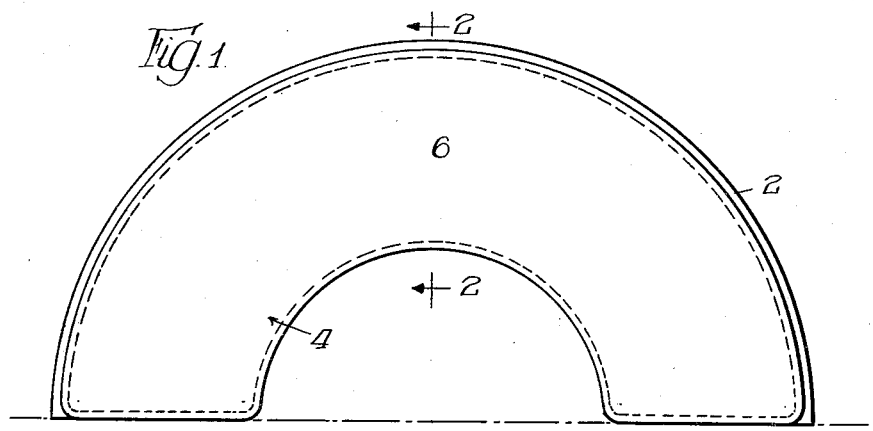
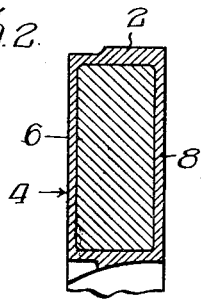
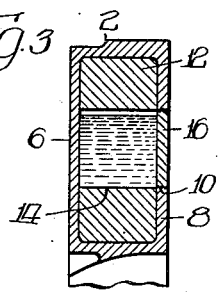
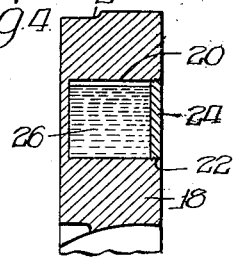
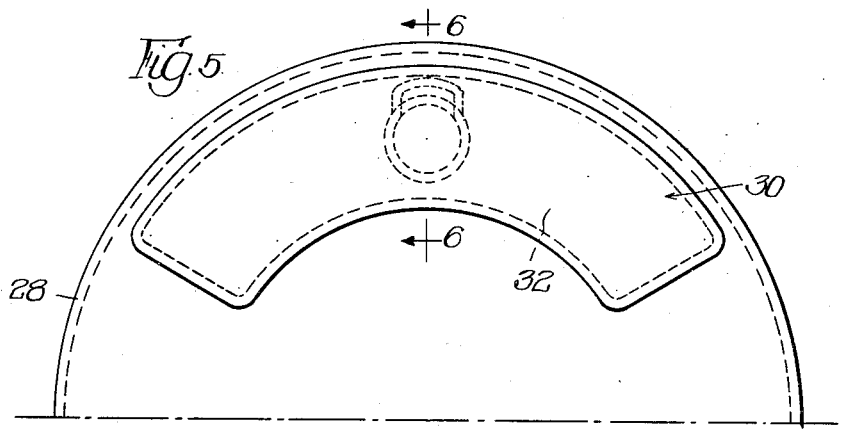
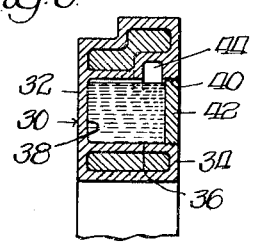
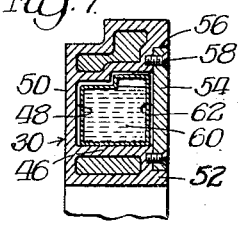
Inventor:
Harry E. Doerr,
By Wilkinson, Huxley, Byron & Knight
Attys Patented Oct. 9, 1934

1,976,546

UNITED STATES PATENT OFFICE 1,976,546

COUNTER-BALANCE FOR LOCOMOTIVE DRIVE WHEEL CENTERS

Harry E. Doerr, St. Louis, Mo.

Application May 13, 1932, Serial No. 611,087

12 Claims. (Cl. 295—6)

The present invention relates to wheels, and more in particular to wheels or wheel centers for locomotives or the like.

At the present time there is a large number of heavy locomotives with large cylinders and a long stroke using small driving wheels or driving wheel centers, and under these conditions it has been found impossible to properly counter-balance the weights of the revolving and reciprocating parts which are necessarily heavy, in order to run or drive these locomotives at an economical speed. Under these conditions, these locomotives are now being run at from 30 to 35 miles per hour, while the economical speed thereof is between 40 and 50 miles per hour. This increased speed of operation could be easily attained if it were possible to properly counter-balance the driving wheels therefor. Various attempts have been made to solve this problem, but have been unsuccessful because of the fixed relation of the various elements of these locomotives.

It is therefore an object of the present invention to provide novel means for properly counter-balancing the wheels or wheel centers of locomotives now in use, and which are now driven at a low speed, whereby these locomotives may be run or driven at greatly increased speeds.

Another object of the present invention is to provide a novel wheel or wheel center for a locomotive or the like, which, when placed in running position in a locomotive, will be properly counter-balanced for counter-balancing the revolving and reciprocating parts associated therewith, whereby the locomotive may be driven at its most economical speed.

More particularly, the present invention contemplates the idea of reconstructing a locomotive drive wheel or center which is improperly counter-balanced and in which the counter-balance extends through a maximum angular distance and which could not be used if the locomotive were driven at an increased speed without violating the rules of safety provisions and without damaging not only the associated elements and structure, but likewise under certain conditions, derailing the locomotive and the cars being drawn thereby. In the present instance, the counter-balance is reconstructed to provide a suitable space for receiving material having a specific gravity much greater than the specific gravity of the material forming the wheel or wheel center, as likewise the material which may form the counter-balance.

As the present invention is applicable to a new locomotive drive wheel or center, various advantages are present in incorporating a body of this counter-balancing material of large specific gravity with the ordinary material used for counter-balances.

Other objects, features, capabilities and advantages are comprehended by the invention, as will later appear and as are inherently possessed thereby.

Referring to the drawing:

Figure 1 is a fragmentary view in elevation of a wheel or wheel center for a locomotive or the like wherein the counter-balance therefor extends through a maximum angular distance;

Figure 2 is a fragmentary view in cross section taken in a plane represented by line 2—2 of Figure 1 of the drawing;

Figure 3 is a fragmentary view in cross section similar to Figure 2 of the drawing and disclosing the car wheel or center of Figure 1 as reconstructed in accordance with the present invention;

Figure 4 is a fragmentary view in cross section similar to Figure 3 of the drawing disclosing another car wheel reconstructed in accordance with the present invention;

Figure 5 is a diagrammatic view in elevation of a new locomotive wheel or center made in accordance with the present invention;

Figure 6 is a view in cross section taken in a plane represented by line 6—6 of Figure 5 of the drawing; and Figure 7 is a fragmentary view in cross section taken in a plane similar to Figure 6 of the drawing and disclosing an alternative construction for a new locomotive wheel or center.

Referring now more in detail to the drawing, and more in particular to Figures 1 and 2, an embodiment of a locomotive wheel or center is disclosed as comprising a rim 2 adjacent which is a counter-balance pocket 4 having oppositely disposed walls 6 and 8 and having its outer wall formed as an integral part of the rim 2. In this diagrammatic showing in Figure 1, it is of course understood that this locomotive drive wheel or center is formed with a main and crank pin hub, and that the counter-balance pocket 4 is oppositely disposed in relation to the crank pin hub, this pocket 4 being adapted to be filled with some weighty material, such as lead or the like, this material being in common use at the present time for such counter-balance purposes. Further, it is to be also understood that although a locomotive wheel center is disclosed in Figure 1, the present invention is of such a scope as to comprehend novel constructions in locomotive wheels in which the flanged tread portion is formed integral with the rim. Therefore, in the present disclosure and claims, "wheel" is to be understood as referring to either of these two types of construction.

This car wheel disclosed in Figures 1 and 2 of the drawing has a relatively small diameter and corresponds to the wheels as now used on some heavy locomotives with large cylinders and a long stroke. In order to increase the speed of operation of these locomotives, the counter-balance pocket 4 has been extended around the wheel through 180 degrees, as clearly shown. This extension of the counter-balance is of course as far as could be effected in order that the material carried thereby may serve in a counter-balancing capacity. The outside wall 4 of the wheel has been extended outwardly as far as possible and still maintain clearance between the counter-balance and the side rods when the wheel is revolving, and the inside wall 8 has been placed as far inwardly as possible and still maintain the clearance required between the wheel and the stationary parts of the locomotive.

It will therefore be quite apparent that the wheel as shown in this drawing has been employed and constructed to be operated at a maximum speed, the various parts of this wheel being extended maximum distances and limited only by the associated parts on the locomotive and requirements as to design. Even though this wheel as shown has been designed with a maximum amount of space for counter-balance material, the locomotives with which the same have been used could not be safely operated beyond a maximum speed of about 30 miles an hour, because of the lack of suitable counter-balancing material for properly counter-balancing these wheels when the locomotives are driven at greater speeds. The present invention is therefore primarily concerned with the idea of reconstructing this wheel or wheel center so that these locomotives may be driven at greatly increased speeds, as for example, between 40 and 50 miles per hour. In Figure 3 of the drawing, suitable means is disclosed whereby this wheel is reconstructed to provide for the proper counter-balancing of the same when driven at these increased speeds. In this figure, the rear wall 8 of the counter-balance pocket 4 has been drilled and tapped to provide a threaded opening 10. The lead or other counter-balance material 12 which is provided within the pocket 4 is then drilled or removed to form a recess 14 which may have a diameter substantially equal to the diameter of the opening 10 in the rear wall 8. After this removal of a portion of the counter-balance material 12 has been effected, this opening may be filled with any suitable material having a specific gravity greater than the specific gravity of the counter-balance material 12. In the present invention, this substituted counter-balance material is preferably mercury or some suitable alloy thereof, although the present invention contemplates other materials which have a specific gravity in excess of the lead which usually comprises the counter-balance material 12. When this mercury or suitable alloy thereof has been inserted within the recess 14, the substituted counter-balance material may be secured therein as by means of a closure plate or member 16 having a screw-threaded edge engageable with the threads provided in the opening 10. If mercury is used as a substitute counter-balance material, it is of course important to provide suitable space to permit expansion and contraction thereof.

This substituted counter-balance material, because of its greater specific gravity, is effective in properly counter-balancing this locomotive wheel or center so that the locomotive with which the same is associated may be run or driven at greatly increased speeds without danger of causing damage to the parts thereof, as well as causing a derailment of the train.

In Figure 4 of the drawing is disclosed a locomotive drive wheel or center which is formed with a solid counter-balance portion 18 of the same material as the remaining parts thereof. This locomotive drive wheel or center is reconstructed so as to adapt the same for use in locomotives operating at increased speeds, and in order to effect this reconstruction the counter-balance portion may be drilled to provide a recess 20 having a threaded outer end 22 engageable by the threaded ends of a closure plate or member 24. When the material of the counter-balance portion 18 has been removed to provide the recess 20, the same may be filled with a body of material 26 having a specific gravity in excess of the specific gravity for the material of the counter-balance portion 18, and which in the present disclosure is preferably mercury or some suitable alloy thereof. This body of material 26 is retained in place as by means of the closure plate 24, and as previously indicated, if mercury is the substituted counter-balance material, suitable space should be provided to permit expansion and contraction thereof under variations in temperature.

In Figures 5 and 6 is diagrammatically disclosed an embodiment for a new locomotive drive wheel or center made in accordance with the present invention, and the same is disclosed as comprising a rim 28 adjacent which is provided a counter-balance pocket 30. As in the embodiment shown in Figure 1 of the drawing, a main and crank pin hub is provided, and the counter-balance pocket 30 is disposed in opposite relation to the crank pin hub. Spokes or other suitable members which are not disclosed, may extend between the hub portions and rim, as likewise between the main hub and counter-balance pocket 30. In this new construction for a locomotive drive wheel or center therefor, the counter-balance is shown as including oppositely disposed walls 32 and 34 between which extends a substantially cylindrical wall 36 providing an interior chamber 38, and which communicates with an opening 40 in the rear wall 34. In the construction as shown in Figure 6, the counter-balance pocket 30 is filled with a counter-balance material such as lead or the like, which completely surrounds the wall 36. In order to properly counter-balance the locomotive drive wheel or center therefor, the chamber 38 may be filled with material having a specific gravity greater than the specific gravity of the lead within the pocket 30, and as previously indicated, the present invention contemplates the idea of using mercury or some suitable alloy thereof. This mercury or alloy thereof may be inserted within the chamber 38 and retained in position as by means of a closure plate 42 formed with threads engaging with threads provided in the wall 36. In order to provide for the expansion of the mercury, the wall 36 of the chamber 38 is formed with a recess 44 to permit this expansion without causing damage to the locomotive wheel or center.

If desired, the counter-balance pocket 30 may be constructed as disclosed in Figure 7 of the drawing, in which a wall 46 forming a chamber 48 within the pocket 30 extends between the outer and inner walls 50 and 52, respectively, of the counter-balance pocket 30, this chamber 48 being normally closed as by means of a closure plate 54 fitting within a recess 56 formed in the inside or rear wall 52 of the counter-balance pocket 30 and held therein as by means of counter-sunk screws or the like 58. In this embodiment, the body of counter-balance material 60 having a specific gravity greater than the specific gravity of the material within the counter-balance pocket 30 may be retained within a container 62 which may be conveniently inserted within the chamber 48 and retained in place as by means of the closure plate 54. As in the previously disclosed embodiments, when this counter-balance material constitutes mercury or the like, a suitable space should be provided in the container 62 to provide for the expansion thereof.

It will be quite apparent from the above disclosure that the present invention contemplates and provides a novel way in which to reconstruct a locomotive drive wheel or center thereof, whereby the same may be run or driven at greatly increased speeds. The invention also comprehends the idea of providing a novel locomotive drive wheel or center which may be easily fabricated and in which a portion of the counter-balance material may be mercury or some suitable alloy thereof, thus providing a wheel which may be properly counter-balanced and is structurally of few parts and simple in construction.

While I have herein described and upon the drawing shown an illustrative embodiment of the invention, it is to be understood that the invention is not limited thereto but may comprehend other constructions, arrangements of parts, details and features without departing from the spirit of the invention.

I claim:

1. A wheel for a locomotive or the like, comprising a member formed of suitable material, said member having a counter-balance portion of material other than of material forming said member, and a body of material having a specific gravity greater than the specific gravity of the material of said member and counter-balance portion and being associated with said counter-balance portion for properly counter-balancing said wheel.

2. A wheel for a locomotive or the like, comprising a member formed of suitable material and having a counter-balance pocket, counter-balance material within said pocket, and a body of material associated with said counter-balance material and having a specific gravity greater than the specific gravity of said counter-balance material for properly counter-balancing said wheel.

3. A wheel for a locomotive or the like, comprising a member formed of suitable material and having a counter-balance pocket, counter-balance material within said pocket, said material being other than the material forming said member, and a body of material associated with said counter-balance material and having a specific gravity greater than the specific gravity of said counter-balance material for properly counter-balancing said wheel.

4. A wheel for a locomotive or the like, comprising a member formed of suitable material, said member having a counter-balance portion of material having a specific gravity greater than the specific gravity of said material for said member, and a body of material having a specific gravity greater than the specific gravity of the material of said counter-balance portion for properly counter-balancing said wheel.

5. A wheel for a locomotive or the like, comprising a member formed of suitable material and having a counter-balance pocket, counter-balance material with said pocket and having a specific gravity greater than the specific gravity of the material of said member, and a body of material associated with said counter-balance material and having a specific gravity greater than the specific gravity of said counter-balance material for properly counter-balancing said wheel.

6. In a wheel for a locomotive or the like, the combination of a member formed of suitable material and having a counter-balance portion, said portion being of a material having a specific gravity greater than the specific gravity of the material for said member, a recess provided in said portion, and counter-balance material in said recess and having a specific gravity greater than the specific gravity of the material for said member.

7. In a wheel for a locomotive or the like, the combination of a member formed of suitable material and having a counter-balance pocket, counter-balance material in said pocket and being of a specific gravity greater than the specific gravity of said material for said member, a recess formed in said counter-balance material, and counter-balance material in said recess and of a specific gravity greater than the specific gravity a of said first named counter-balance material.

8. In a wheel for a locomotive or the like, the combination of a member formed of suitable material and having a counter-balance pocket, counter-balance material in said pocket and being of a specific gravity greater than the specific gravity of said material for said member, a recess formed in said counter-balance material, said pocket being provided with an opening communicating with said recess, counter-balance material in said recess and of a specific gravity greater than the specific gravity of said first named counter-balance material, and closure means for said opening for retaining said last-named counter-balance material in said recess.

9. A wheel for a locomotive or the like, comprising a member having a counter-balance pocket, a walled compartment within said pocket, counter-balance material within said pocket and surrounding said compartment, and counter-balance material within said compartment and of a specific gravity greater than the specific gravity of said material within said pocket.

10. A wheel for a locomotive or the like, comprising a member having a counter-balance pocket, a wall compartment within said pocket, a wall of said pocket being provided with an opening communicating with said compartment, counter-balance material within said pocket and surrounding said compartment, counter-balance material within said compartment and of a specific gravity greater than the specific gravity of said material within said pocket, and closure means for said opening for retaining said last named material in place.

11. A wheel for a locomotive or the like, comprising a member having a counter-balance pocket, a walled compartment within said pocket, a wall of said pocket being provided with an opening communicating with said compartment, counter-balance material within said pocket and surrounding said compartment, counter-balance material within said compartment and of a specific gravity greater than the specific gravity of said material within said pocket, and closure means for said opening for retaining said last named material in place, said compartment being formed to provide space for expansion of said last named material.

12. A wheel for a locomotive or the like, comprising a member having a counter-balance pocket, a walled compartment within said pocket, a wall of said pocket being provided with an opening communicating with said compartment, a receptacle insertable through said opening and receivable in said compartment and containing a counter-balance material of a specific gravity greater than the specific gravity of said material within said pocket, and closure means for said opening for retaining said receptacle in place within said compartment.

HARRY E. DOERR.